United States Patent [19]
Loving

[11] Patent Number: 5,103,567
[45] Date of Patent: Apr. 14, 1992

[54] GUNNER'S AUGMENTATION SIGHT

[75] Inventor: Ronald E. Loving, Simi Valley, Calif.

[73] Assignee: Aircraft Company Hughes, Los Angeles, Calif.

[21] Appl. No.: 611,599

[22] Filed: Nov. 13, 1990

[51] Int. Cl.⁵ .............................................. F41G 1/38
[52] U.S. Cl. .................................. 33/245; 33/235; 42/100; 42/101
[58] Field of Search .................. 33/233, 235, 241, 242, 33/244, 245–250; 350/96.24, 96.25, 96.26, 96.20; 385/116, 117; 42/100, 101

[56] References Cited

U.S. PATENT DOCUMENTS

| | | | |
|---|---|---|---|
| 3,641,261 | 2/1972 | Chaplin et al. | 350/96.25 |
| 3,678,590 | 7/1972 | Hayward | 33/241 |
| 4,255,013 | 3/1981 | Allen | 33/247 |
| 4,518,221 | 5/1985 | Francois | 350/96.26 |
| 5,054,225 | 10/1991 | Giuffre et al. | 42/101 |

FOREIGN PATENT DOCUMENTS

| | | | |
|---|---|---|---|
| 0192550 | 8/1986 | European Pat. Off. | 350/96.25 |
| 1244020 | 7/1967 | Fed. Rep. of Germany | 350/96.25 |
| 3004635 | 8/1981 | Fed. Rep. of Germany | 33/233 |
| 0008105 | 1/1981 | Japan | 350/96.25 |
| 0193403 | 11/1984 | Japan | 350/96.26 |

OTHER PUBLICATIONS

"Fiber Optics for Industrial Use", American Cystoscope Makers, Inc. Jun.7 1961.
AO Fiberscope System, American Optical Corporation, SPIE Journal, Apr. 1970, p. G-17.
AO Fibroptics, American Optical, Sep. 3, 1974, pp. 1-9.

*Primary Examiner*—William A. Cuchlinski, Jr.
*Assistant Examiner*—Alvin Wirthlin
*Attorney, Agent, or Firm*—Michael W. Sales; Wanda K. Denson-Low

[57] ABSTRACT

A remote imaging target sight that may be used with numerous weapons such as pistols, rifles and man-portable anti-tank weapons that provides a gunner with the ability to sight around a corner or an obstruction without exposing himself to enemy fire. The sight comprises an imaging telescope, a fiber optic bundle, and an objective lens employed for viewing, all of which are disposed in a flexible sheath or housing. The housing is mounted to and extends outside the body of the weapon to which the sight is secured. The imaging telescope may employ a replaceable lens section that permits the use of different lenses having different focal lengths. This permits the use of the weapon for differing sighting environments and target distances. The flexible housing typically comprises two pieces of metal or plastic coiled around each other to form an interlocked spiral coil of the type used on gooseneck lamps and microphones. The sheath or housing, may comprise a bendable material that flexes into a desired curved shape selected by the gunner. The fiber optic bundle is also flexible, and is disposed within the flexible housing and permits coupling of light from the image scene to the gunner under varying conditions. The sight may also include a support member that is secured to the weapon that assists in holding the telescope portion of the sight in a fixed position.

7 Claims, 2 Drawing Sheets

U.S. Patent     Apr. 14, 1992     Sheet 1 of 2     5,103,567
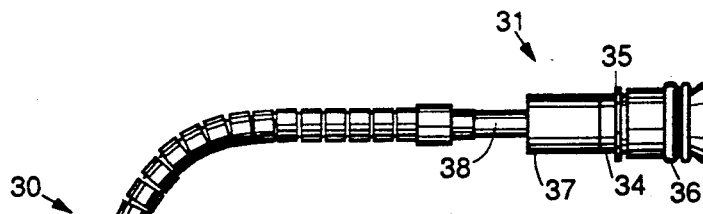
FIG. 1.
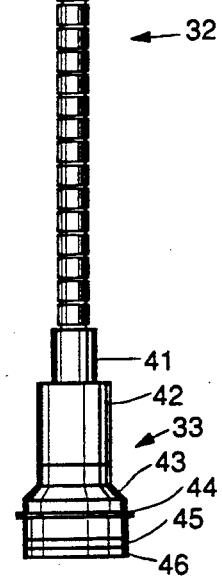
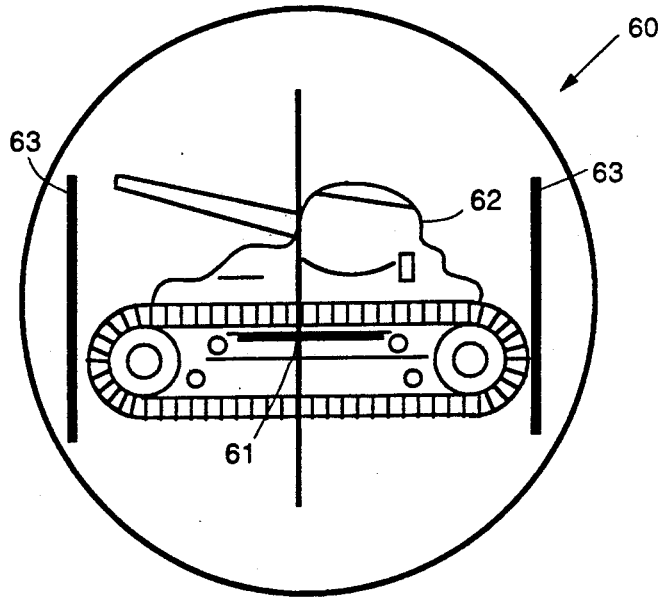
FIG. 2.
FIG. 3.
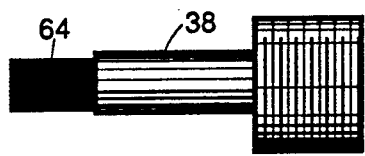
FIG. 4.
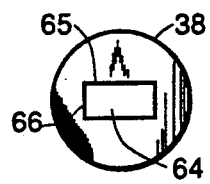
FIG. 5.
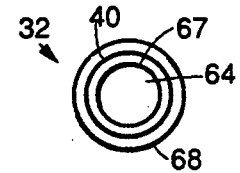

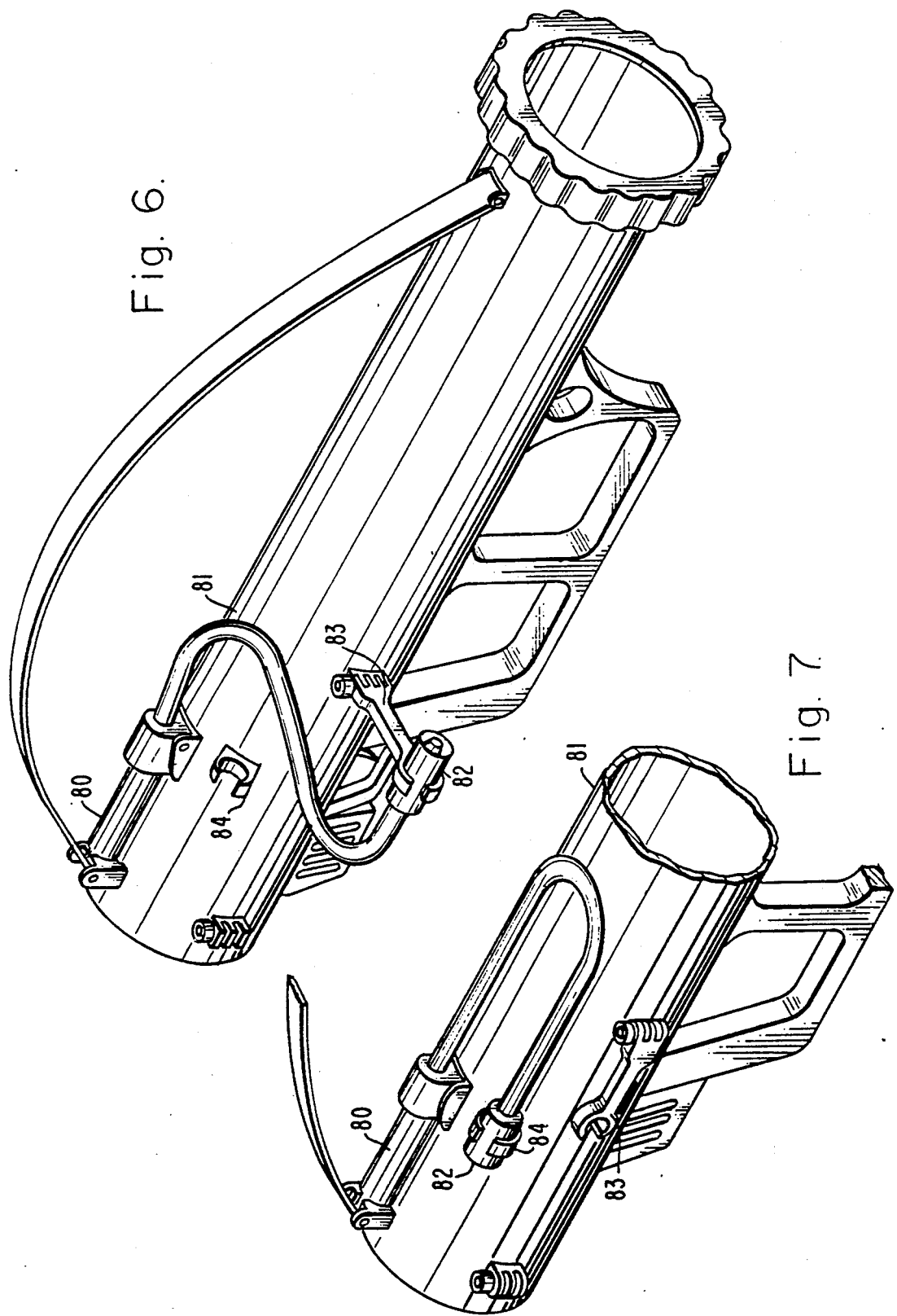

GUNNER'S AUGMENTATION SIGHT

BACKGROUND

The present invention relates generally to sighting devices, and more particularly, to a weapon sighting device that permits the user to sight around corners.

Conventional pistols, rifles and man-portable anti-tank weaponsincorporate sighting mechanisms that do not permit a gunner to sight around a corner. Consequently, the gunner is exposed to small arms fire when attempting to sight and fire conventional small arms and man-portable anti-tank weapons. In a police SWAT team situation or in a military combat situation, for example, conventional weapons are aimed wildly around a corner so that the gunner does not have to expose himself to weapons fire. This has resulted in wasted ammunition, and very poor marksmanship.

Accordingly, there has been a need for a small arms and man-portable anti-tank weapon or rifle sight that permits the gunner to sight around a corner without exposing himself to enemy gunfire.

SUMMARY OF THE INVENTION

In accordance with this and other objectives and advantages of the present invention, an optical gun sight is provided that may be used with numerous weapons such as pistols, rifles and anti-tank weapons that provides the gunner with the ability to sight around a corner or an obstruction without exposing himself to enemy fire. The sight comprises an imaging telescope, a fiber optic bundle, and an objective lens employed for viewing, all of which are disposed in a flexible sheath or housing. The sight extends outside the body of a weapon to which it is secured. The imaging telescope may also employ a removable and replaceable lens section that permits the use of different lenses having different focal lengths. This permits the use of the weapon for differing sighting environments and target distances.

The flexible sheath or housing comprises a flexible sheath formed of two interlocked spiral coils. It may be made of plastic, or a metal such as chrome plated steel, stainless steel, or the like. Such a flexible sheath is conventionally used in gooseneck lamps or microphone stands, and may be manually bent into a curved shape and will remain in that shape. The fiber optic bundle is also flexible, and is disposed within the flexible sheath or housing and permits coupling of light from the image scene to the gunner under varying conditions. The sight of the present invention thus permits the gunner to view objects around a corner or other obstruction without exposing himself to view and to enemy gunfire. The sight may also include a support member that is secured to the weapon that assists in holding the telescope portion of the sight in a fixed position.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a plan view of a remote imaging target sight constructed in accordance with the principles of the present invention;

FIG. 2 is an image of a target obtained through the sight of FIG. 1 showing a reticle or cross hairs and showing stadia markers;

FIG. 3 is a side view of a threaded ferrule used in the remote imaging target sight of FIG. 1 to terminate a bundle of optical fibers;

FIG. 4 shows the viewing end of the threaded ferrule of FIG. 3 illustrating how the ends of the bundle of optical fibers define a rectangular planar viewing matrix;

FIG. 5 is a cross-sectional view of a viewing tube assembly of the remote imaging target sight of FIG. 1 illustrating the various layers that it includes;

FIG. 6 is a perspective view of a different embodiment of the remote imaging target sight of the present invention fitted to a man-portable antitank weapon; and FIG. 7 is a partly broken away perspective view of the antitank weapon of FIG. 6 with the remote imaging target sight in a stowed position.

DETAILED DESCRIPTION

Referring now to FIG. 1 of the drawings, there is shown an embodiment of a remote imaging target sight 30 constructed in accordance with the principles of the present invention. The remote imaging target sight 30 has an objective lens assembly 31 connected to one end of an elongated flexible viewing tube assembly 32, and has a front imaging telescope lens assembly 33 connected to the other end of the viewing tube assembly 32. By bending the elongated flexible viewing tube assembly 32 as shown in FIG. 1, a gunner may use the remote imaging target sight 30 for aiming a weapon at a target located around a corner. As will be more fully explained hereinafter, the interior of the viewing tube assembly employs fiber optic techniques to convey an image from the front imaging telescope lens assembly 33 around a corner to the objective lens assembly 31.

The front imaging telescope lens assembly 33 comprises a plurality of lenses adapted to have a preselected magnifying power based upon the normal scenario in which the weapon is employed. One of the lenses may be removable and replaceable. Utilization of a replaceable lens adapts the telescope lens assembly 33 for use at different focal lengths. This permits the use of the weapon for differing sighting environments and target distances.

The objective lens assembly 31 includes a lens housing 34 containing a plurality of lenses and having a focusing adjustment ring 35. Lens assembly 31 also has a preselected magnification power and focus which may be optically adjusted using ring 35. The lens housing 34 may be any conventional objective having two, three or four lenses, and having an aperture 25 mm in diameter or less. A suitable lens housing 34 is obtainable from Edmunds Scientific, 101 E. Gloucester Pike, Barrington, N.J. A flexible eyecup 36 made of rubber or neoprene, or the like, is slipped over the viewing end of the lens housing 34 like a boot. If desired, the eyecup 36 may be cemented in place although it is not usually necessary because of the snug fit. The eyecup 36 excludes ambient light and fits the facial contours of a gunner and acts as a cushion. A suitable eyecup 36 is also available from Edmunds Scientific.

A first cylindrical barrel 37, which is threaded at both ends, has the lens housing 34 screwed into one end thereof. The first cylindrical barrel 37 may be made of a plastic such as polycarbonate, or the like. The first cylindrical barrel 37 serves the purpose of maintaining the lens housing 34 at a suitable focal distance. A first threaded ferrule 38 is screwed into the other end of the first cylindrical barrel 37. The first threaded ferrule 38 is fastened to one end of a flexible sheath 40 formed of two interlocking spiral coils. The flexible sheath 40 may be made of plastic or a metal such as stainless steel, chrome plated steel, or the like. This type of flexible sheath 40 may be manually bent into a curved shape and will remain in that shape. It is conventionally used in gooseneck lamps, microphone stands or armored electrical cable such as that known as BX cable. A suitable flexible sheath 40 may be obtained from MCM Electronics, 650 Congress Park Dr., Centerville, Ohio. The flexible sheath 40 forms the obedient sheathing part of the viewing tube assembly 32. Typically, for use in the embodiment illustrated in FIG. 1, the flexible sheath 40 may be on the order of 12 to 20 inches long. However, in special situations. the viewing tube assembly 32, including the flexible sheath 40, may be made five or six feet long, if desired.

A second threaded ferrule 41 is fastened to the other end of the flexible sheath 40. The second threaded ferrule is screwed into one end of a second cylindrical barrel 42, which is very similar to or is identical to the first cylindrical barrel 37. A viewing lens housing 43 is screwed into the other end of the second cylindrical barrel 42 and contains lenses and is provided with a focus adjustment ring 44. The second cylindrical barrel 42 positions the viewing lens housing 43 at a suitable focal distance. The viewing lens housing 43 may be a conventional camera lens such as is employed on a 35 mm camera. The viewing lens housing 43 contains a plurality of lenses, and is provided with a focus adjustment ring 44. Any typical, conventional camera lens, such as a wide angle lens, or a zoom lens, or the like may be employed in the remote imaging target sight 30. Other attachments may be screwed into the outer end of the viewing lens housing 43, such as a polarizing filter 45 or an infrared filter 46. Such attachments help to ameliorate enemy countermeasures such as aiming a laser at the gunner to produce the effect known as laser dazzle. Furthermore, the remote imaging target sight 30 may be fitted with a focal plane array, if desired, to form a flexible night vision viewing device.

Referring now to FIG. 2, there is shown an image 60 that is typical of that formed in the front imaging telescope lens assembly 33. The viewing lens housing 43 is provided with a reticle or cross hairs 61 that may be lined up on a target such as a tank 62. Stadia markers 63 are provided within the viewing lens housing 43 to give an indication of the target range. For example, if the target exactly fills the distance between the stadia markers 63, then the tank 62 is exactly 500 yards away.

Referring now to FIG. 3, there is shown a side view of the first threaded ferrule 38. The ferrule 38 is shown unscrewed and separated from the first cylindrical barrel 37 and separated from the flexible sheath 40 that were shown in FIG. 1. Protruding from one end of the first threaded ferrule 38 are broken-away strands of a bundle of optical fibers 64. There may be 40,000 strands, for example, in the bundle of optical fibers 64. Each strand may be on the order of 0.0025 inch thick, and each strand is made of high quality optical glass that transmits light with high efficiency. A suitable bundle of optical fibers 64 may be obtained from the Galileo Company, located in Massachusetts.

FIG. 4 shows the viewing end of the first threaded ferrule 38 shown in FIG. 3. The bundle of optical fibers 64 is arranged in the form of a rectangular matrix having a top 65 and a side 66. The ends of the strands are arranged in a predetermined order and bonded permanently together. The end of the bundle of optical fibers 64 is optically polished to form a smooth planar surface. The other end of the bundle of optical fibers 64 is finished in the same manner, and the individual strands are arranged in the same predetermined order. Any image that is focused on the matrix at the far end travels down the bundle of optical fiber 64 and appears on the matrix at the near or viewing end. In order to focus on the matrices, the lenses are located about 0.5 inches therefrom which is the approximate focal distance. This separation between the lenses and the matrices is provided by the cylindrical barrels 37, 42 shown in FIG. 1. Fine adjustment of the focus is achieved by moving the adjustment rings 35, 44. It will be understood that the embodiment illustrated is by way of example only. If desired, the matrix may be square or circular, for example, and the number of strands may be more or less than 40,000. If desired, the Galileo Co. will provide the entire viewing tube assembly 32 ready made, terminated with first and second threaded ferrules 38, 41 optically polished and ready to use.

FIG. 5 shows a cross sectional view of a typical viewing tube assembly 32 constructed in accordance with the invention. The bundle of optical fibers 64 is covered with a protective sheath 67 which may be made of heat shrink tubing, if desired. The protective sheath 67 keeps the bundle of optical fibers 64 free from mechanical abrasion. Around that layer is disposed the flexible sheath 40 that was described in detail hereinbefore. Finally, around the flexible sheath 40 there may be placed an outer covering 68 that also may be made of heat shrink tubing, if desired. This outer covering 68 may be omitted, if desired, although in some cases it may help to keep dust and grit out of the viewing tube assembly 32, and it also may serve ornamental purposes.

In operational use, the first step is to fasten the front imaging telescope lens assembly 33 to the frame of a weapon such as a pistol or a rifle by means of a conventional pistol or rifle scope mount. The axis of the front imaging telescope lens assembly 33 is aligned with the axis of the weapon. The focusing adjustment ring 35 is adjusted to focus the image on the matrix at the far end of the viewing tube assembly 32. The objective lens assembly 31 is moved to the appropriate location by bending the flexible sheath 40. The focus adjustment ring 44 is adjusted to focus the objective on the matrix at the near end of the viewing tube assembly 32. Appropriate attachments such as the polarizing filter 45 and the infrared filter 46 are selected. If desired, a zoom lens may be attached and switched in or out. After use, if desired a lens cap may be attached to the outer end of the viewing lens housing 43.

FIG. 6 shows a different embodiment of the remote imaging target sight 80 attached to a man-portable anti-tank weapon 81. In the embodiment of FIG. 6, the remote imaging target sight 80 is not used to look around a corner. Instead, it is used to enable the gunner to have the weapon 81 on his shoulder while looking through an eyepiece 82 at a target. This arrangement automatically aligns the gunner's line of sight through the remote imaging target sight 80 with the weapon boresight. A clamp 83 is provided to hold the eyepiece 82. FIG. 7 shows the weapon 81 of FIG. 6 with the remote imaging target sight 80 in a stowed position. The eyepiece 82 is folded back and snapped into a holder 84 where it is out of the way. In the stowed position, the clamp 83 is moved or rotated into a position close to the body of the weapon 81.

The remote imaging target sight 80 thus permits the gunner to view objects around a corner or other obstruction without exposing himself to view and to enemy gunfire. Thus, the remote imaging target sight 80 is adapted for use with numerous weapons including pistols, rifles and man portable anti-tank weapons and provides the gunner with the ability to sight around a corner without exposing himself to enemy fire.

Thus there has been described a new and improved weapon sighting device that permits the user to sight around corners. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A weapon system comprising:
   a weapon;
   a telescope assembly fixably mounted on and aligned with the boresight of said weapon for providing a view of a target which is constantly aligned with the boresight;
   an eyepiece assembly removably mounted on said weapon for presenting an image of the target to a gunner;
   a flexible fiber optic tube assembly having a plurality of optical fibers and connected at one end to the telescope assembly end and at another end to the eyepiece assembly for conveying the image of the target from the telescope assembly to the eyepiece assembly;
   a holder for holding the eyepiece in a fixed position on said weapon when said weapon is not in use; and
   a clamp mounted on said weapon for holding the eyepiece in a gunner preferred position away from said weapon when said eyepiece is in use, said clamp including means for folding the clamp to a position against said weapon when said eyepiece is not in use.

2. The weapon system of claim 1 further comprising:
   a cylindrical barrel disposed in said eyepiece assembly for optically adjusting said eyepiece assembly.

3. The weapon system of claim 1 further comprising:
   a cylindrical barrel disposed in said telescope assembly for optically adjusting said telescope assembly.

4. The weapon system of claim 1 further comprising stadia markers disposed in said eyepiece assembly for providing range information for the image presented to the gunner.

5. The weapon system of claim 1, said telescope assembly further comprising means for switching lenses to change the magnification power of said telescope.

6. The weapon system of claim 1 further comprising a laser filter disposed in said eyepiece assembly for attenuating light in a predetermined frequency bandwidth.

7. The weapon system of claim 1 wherein said weapon is manportable.

* * * * *